US010698200B2

(12) United States Patent
Griffin et al.

(10) Patent No.: US 10,698,200 B2
(45) Date of Patent: Jun. 30, 2020

(54) OPTICAL SYSTEM FOR A DISPLAY WITH AN OFF AXIS PROJECTOR

(71) Applicant: The Technology Partnership Plc, Royston, Hertfordshire (GB)

(72) Inventors: Neil Griffin, Royston (GB); Nick Wooder, Royston (GB); Luis Diaz-Santana, Royston (GB)

(73) Assignee: The Technology Partnership Plc (GB)

( * ) Notice: Subject to any disclaimer, the term of this patent is extended or adjusted under 35 U.S.C. 154(b) by 251 days.

(21) Appl. No.: 15/572,983

(22) PCT Filed: May 10, 2016

(86) PCT No.: PCT/GB2016/051333
§ 371 (c)(1),
(2) Date: Nov. 9, 2017

(87) PCT Pub. No.: WO2016/181126
PCT Pub. Date: Nov. 17, 2016

(65) Prior Publication Data
US 2018/0143427 A1     May 24, 2018

(30) Foreign Application Priority Data
May 11, 2015    (GB) .................................. 1508006.2

(51) Int. Cl.
*G02B 26/08*         (2006.01)
*G02B 27/00*         (2006.01)
(Continued)

(52) U.S. Cl.
CPC ........... *G02B 27/0037* (2013.01); *G02B 5/18* (2013.01); *G02B 27/0101* (2013.01);
(Continued)

(58) Field of Classification Search
CPC ............ G02B 27/0037; G02B 27/0176; G02B 27/0149; G02B 27/0101; G02B 27/0172;
(Continued)

(56) References Cited

U.S. PATENT DOCUMENTS

| 3,940,204 A | 2/1976 | Withrington |
| 5,526,183 A * | 6/1996 | Chen ................. G02B 27/0172 359/629 |

(Continued)

FOREIGN PATENT DOCUMENTS

WO       2011124897 A1     10/2011

OTHER PUBLICATIONS

Kress, B. et al., "A review of head-mounted displays (HMD) technologies and applications for consumer electronics", Optical Sensing II, Proceedings of SPIE, vol. 8720, May 31, 2013 (May 31, 2013), pp. 87200A-1 to 8700A-13.
(Continued)

*Primary Examiner* — Euncha P Cherry
(74) *Attorney, Agent, or Firm* — Lerner, David, Littenberg, Krumholz & Mentlik, LLP

(57) ABSTRACT

An optical projection system provides part of a display system that presents a displayed virtual image at a predetermined distance in front of a viewing position. Said display system comprises a projection system and a primary reflecting optic that deflects an off-axis incoming optical signal from the projection system toward the viewing position. Said projection system is arranged to provide an adapted output image signal that compensates for optical aberration effects introduced by the reflecting optic to ensure provision of a reduced aberration display image to the viewing position, and where the reflecting optic comprises a grating structure.

24 Claims, 7 Drawing Sheets

(51) Int. Cl.
*G02B 27/01* (2006.01)
*G02B 5/18* (2006.01)
(52) U.S. Cl.
CPC ..... *G02B 27/0149* (2013.01); *G02B 27/0172* (2013.01); *G02B 27/0176* (2013.01); *G02B 2027/011* (2013.01); *G02B 2027/013* (2013.01); *G02B 2027/0145* (2013.01); *G02B 2027/0154* (2013.01); *G02B 2027/0178* (2013.01)
(58) Field of Classification Search
CPC .... G02B 2027/0178; G02B 2027/0154; G02B 2027/013; G02B 2027/011; G02B 2027/0145; G02B 5/18
See application file for complete search history.

(56) References Cited

U.S. PATENT DOCUMENTS

| | | | |
|---|---|---|---|
| 6,353,503 | B1 | 3/2002 | Spitzer et al. |
| 8,384,999 | B1 | 2/2013 | Crosby et al. |
| 2002/0186179 | A1 | 12/2002 | Knowles |
| 2004/0108971 | A1 | 6/2004 | Waldern et al. |
| 2009/0190094 | A1 | 7/2009 | Watanabe et al. |
| 2010/0149073 | A1* | 6/2010 | Chaum .............. G02B 27/0093 345/8 |

OTHER PUBLICATIONS

International Search Report for PCT/GB2016/051333 dated Sep. 13, 2016.

* cited by examiner

OPTICAL SYSTEM FOR A DISPLAY WITH AN OFF AXIS PROJECTOR

CROSS-REFERENCE TO RELATED APPLICATIONS

The present application is a national phase entry under 35 U.S.C. § 371 of International Application No. PCT/GB2016/051333 filed May 10, 2016, published as WO 2016/181126, which claims priority from Great Britain Patent Application No. 1508006.2 filed May 11, 2015, the disclosures of which are incorporated herein by reference.

FIELD OF INVENTION

The present invention relates to display systems that present a virtual image of a source display via a primary reflecting optic positioned near to a viewing device in combination with an optical projection system located away from the viewing axis.

BACKGROUND OF THE INVENTION

Such an arrangement is frequently used for head-up displays (HUDs) and head/helmet-mounted displays (HMDs) in products such as vehicle windscreen displays, military helmets, virtual reality (VR) headsets, augmented reality (AR) headsets and 'smart glasses'. In such applications, positioning the optical projection system away from the viewing axis means that the forward view need not be obstructed, allowing for transparent displays. It also means that the display system can be arranged in a compact manner, for example, by locating the optical projection system to the side of the head in a HMD application.

Conventionally, the primary reflecting optic may be either a beam combiner that is partially reflecting and partially transmitting, or it may be a purely reflecting component. Examples of how the primary reflecting optic may be implemented include the following:
1. a surface of the transparent window already existent in the device (e.g. a windscreen);
2. a partially reflecting structure incorporated in a transparent window;
3. an additional transparent component, for example a flat plate of glass acting as a beam combiner in traditional HUD devices;
4. a non-transparent component in a VR device.

Traditional HUD devices use a flat or nearly flat reflector angled at around 45 degrees from the viewing axis, as in 1 or 3 above. This permits viewing of the reflection of a large conventional display image source (such as an LCD display panel) located close to the reflector. This approach is simple but it has some disadvantages. Without magnification in the reflector, the source display must be as large as the desired virtual image, making the display and related optics very bulky. Furthermore, it is not possible to control the apparent distance of the virtual image, which is particularly problematic for near-to-eye applications, where the image distance must be extended significantly to give a comfortable viewing distance.

Some traditional HUDs use additional optics to control distortion and virtual image distance. This improves image quality and position, but adds considerable bulk and does not reduce the requirement for the output window of the projection optics to be of similar angular size to the displayed image.

In contrast, other approaches use a reflector that is significantly non-planar and therefore provides significant optical power to the imaging system. This allows a much smaller source image display (e.g. one of various types of 'microdisplay') to be magnified and presented to the viewer at a controlled virtual image distance. A necessary compromise when applying magnification is that the volume of space in which the displayed image is viewable (the 'eyebox') is restricted, but this is often acceptable when the position of the viewing optic is controlled sufficiently accurately.

The form of the reflector in these systems is typically an 'off-axis' paraboloid, biconic or similar shape. Such a reflector form can be relatively bulky however, and the unattractive and bulky appearance of such designs limits the applications.

The reflector can be made more visually appealing and compact by segmenting the reflecting surface as a 'grating' structure in a similar manner to a Fresnel lens. This allows the reflection angle from the surface to be controlled independently from the base curvature of the substrate in which the grating is formed. Such a grating structure can be optionally embedded within a transparent material as disclosed in WO 2011124897 A1. By additionally making the reflector partially transmissive, this allows the transmitted portion of the light to be undeviated so that the view through the embedding optic is substantially unaffected. Such an approach allows the implementation of HMDs and HUDs with beam combiners embedded within arbitrarily shaped transparent components such as spectacle lenses, helmet visors and windscreens.

Reflectors with magnifying power can provide design flexibility and enable the use of microdisplays. However, if used to directly image a display source, they give very poor image quality because the reflecting surface introduces various optical aberrations. To recover a good image, additional optical components are required to counteract the aberrations caused by the reflector.

The primary reflecting optic can be designed to be a freeform asphere or freeform asphere grating, giving some flexibility in controlling aberrations, but a single surface alone cannot provide sufficient degrees of freedom to prevent aberrations for an extended image. For an axially symmetric system, the reflector would be expected to introduce spherical aberration, coma, distortion, astigmatism, tilt and other higher order aberrations. This system requires a strongly off-axis reflection, so the surface also introduces more complex binodal aberrations.

In the case of an embedded grating structure, embedding the segmented reflector within a transparent substrate which may have a curved surface introduces additional aberrations. Typically the embedding component follows a curve that is concave on the side oriented toward the viewing optics and projection optics. In this case the light rays encounter a negative powered refractive interface between the reflector and viewing optics, and a highly tilted negative powered refractive interface between the reflector and projecting optics. These surfaces contribute further to the aberrations described above, but also add colour dependence to the aberrations. In particular, the tilt introduces strong lateral colour separation.

Systems of optics designed to counteract these aberrations often suffer from other disadvantages, including: high complexity or large number of optical components leading to high component cost, and tight assembly tolerances, leading to high assembly costs; a large or undesirable space envelope, making it difficult to build the optics into a constrained space, and constraints on position, shape and orientation of the primary reflecting optic.

BRIEF SUMMARY OF THE INVENTION

The present invention provides an optical system that addresses the disadvantages outlined above to allow design of a system with the following properties: magnification of a small display to a large virtual image presented at a comfortable viewing distance in front of the viewing device while correcting aberrations sufficiently to provide a good quality image display; an optical path that can be controlled to follow a convenient route, and to be compact without compromising light throughput and eyebox significantly; an ability to be adapted to different shapes and orientations of the primary reflecting optic; and a simple, low cost and easy to assembly system.

Aspects of the invention that contribute to these properties include:

a simple system of lenses and optical surfaces that correct most of the aberrations with a minimal number and cost of components, and optionally maintaining bilateral symmetry of the underlying design an optional integrated optical component comprising multiple optical surfaces potentially including aspheric surfaces and fold mirrors an optionally tilted source image plane an optional use of fold mirrors to control the path and to allow the primary reflecting optic to be tilted without adding complexity to the optical design correction of distortions by calculating a predistorted image to keep the optics simple ability to accommodate a range of alternative image generation devices using appropriate optical adaptations

BRIEF DESCRIPTION OF THE DRAWINGS

Examples of the present invention will now be described with reference to the accompanying drawings, in which:

FIG. 10 shows a third example embodiment of the system where the primary reflecting optic is a non embedded grating and the system is bilaterally symmetric.

DETAILED DESCRIPTION

Figure 1:
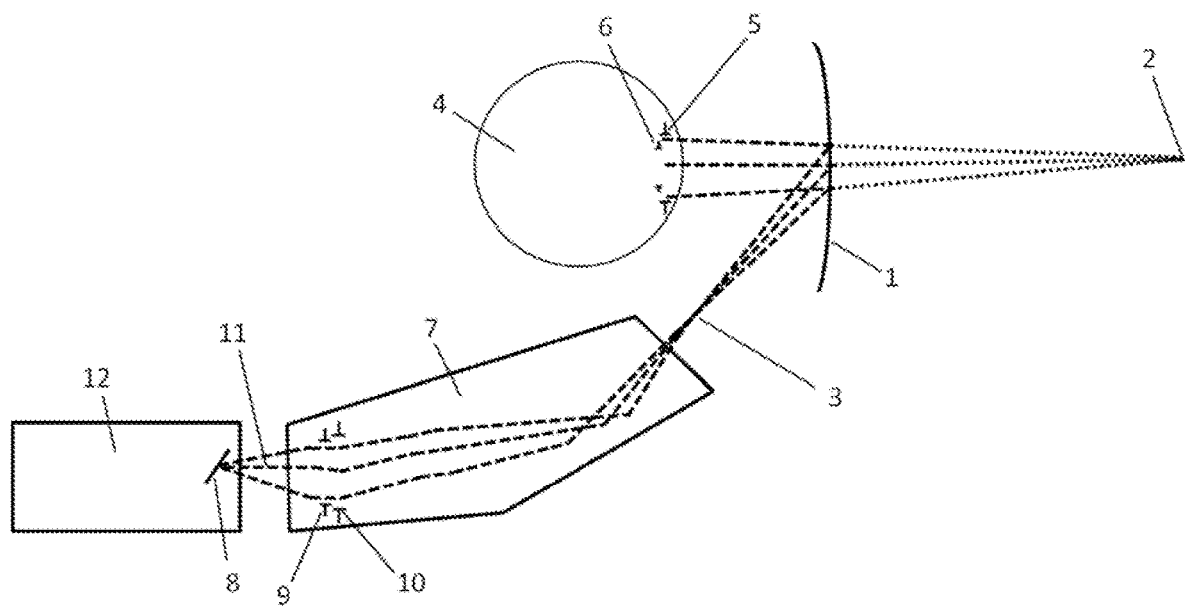
FIG. 1 shows a schematic outline of the full display system.

The different sections of the overall display system are depicted in FIG. 1. The path of selected light rays through the system is indicated by dashed lines and dotted lines indicate the geometric projection of these rays to a virtual image.

The primary reflecting optic 1 creates a virtual image 2 of an intermediate image 3 by providing suitable optical power and tilt. The virtual image is selected to be positioned at a suitable distance and angle in front of the viewing optics 4. Typically the viewing optic is a human eye, and the virtual image is selected to be at a distance between 0.5 m and infinity from the eye. Virtual image distances shorter than 0.5 m, or negative distances may be selected where the display is designed to also correct for a short-sighted or long-sighted viewer. The angular location of the virtual image may be straight ahead, or it may be designed to be oriented away from the straight ahead position which is particularly advantageous when the displayed information should not distract from the normal view through a transparent display.

As the final optical component in the display system, the primary optic 1 also forms the exit pupil of the system 5 which is designed to be coincident with the entrance pupil 6 of the viewing optics 4. The exit pupil 5 of the display system should be preferably at least as large as the entrance pupil 6 of the viewing optics such that the entrance pupil 6 forms the pupil of the overall imaging system.

The image projection optics 7 relay the image to be displayed from the source image 8 located in the source image plane to the intermediate image 3. As described earlier, the primary reflecting optic 1 cannot form an unaberrated image of the intermediate image 3 so to form a good final image, the intermediate image must contain compensating aberrations so that the optical transfer function from the source image 8 to the final virtual image 2 contains reduced aberrations. The function of the image projection optics 7 is to introduce these compensating aberrations and also to provide suitable magnification of the image such that, in combination with the focal length of the primary reflecting optic 1, the desired displayed image size is achieved. Within the image projection optics 7 there is an optional iris, 9 located near to the approximate conjugate of the exit pupil 5. The iris 9 can be used to truncate the light passing through the system. The image projection optics 7 have an entrance pupil 10 which is the image of the iris 9 as viewed from the source image. There is an axial ray 11 that passes through the centre of the image and the centre of the pupil of the image projection optics which can be taken to define the local optical axis of the light path.

The source image 8 is the location of the spatially patterned illumination source that forms the image to be displayed. This source image is formed by the image generation optics 12. This subsystem may incorporate any of a number of alternative display technologies, including backlit liquid crystal display (LCD), liquid crystal on silicon (LCOS), digital micromirror device (DMD) such as a Digital Light Projector (DLP) device from Texas Instruments, an organic light emitting diode (OLED) display or an image projected onto a diffusive screen from a projection display, such as a scanned laser system, a holographic projector, or a conventional imaging projector. In addition to forming the spatial information at the correct position, size and orientation required by the image projection optics 7, the image generation optics 12 must also ensure that sufficient light is emitted from the source image 8 in the direction of the entrance pupil 10 of the image projection optics 7 so that sufficient display brightness is achieved. Preferably, light that does not reach the entrance pupil 10 will be minimised so that the power of the light source can be minimised to reduce energy consumption and heating and also reduce stray light which can cause glare and contrast reduction. Achieving these requirements in combination with the image projection optics 7 requires some specific design implementations described later.

Figure 2:
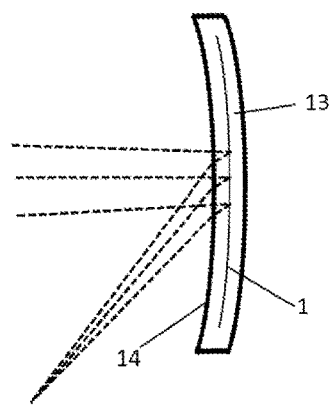
FIG. 2 shows an embedded grating reflector.

FIG. 2 shows an example where the primary reflecting optic 1 is an embedded grating. In this case the reflecting surface is contained within an embedding component 13 such that the light path passes twice through embedding refractive surface 14.

Figure 3A:
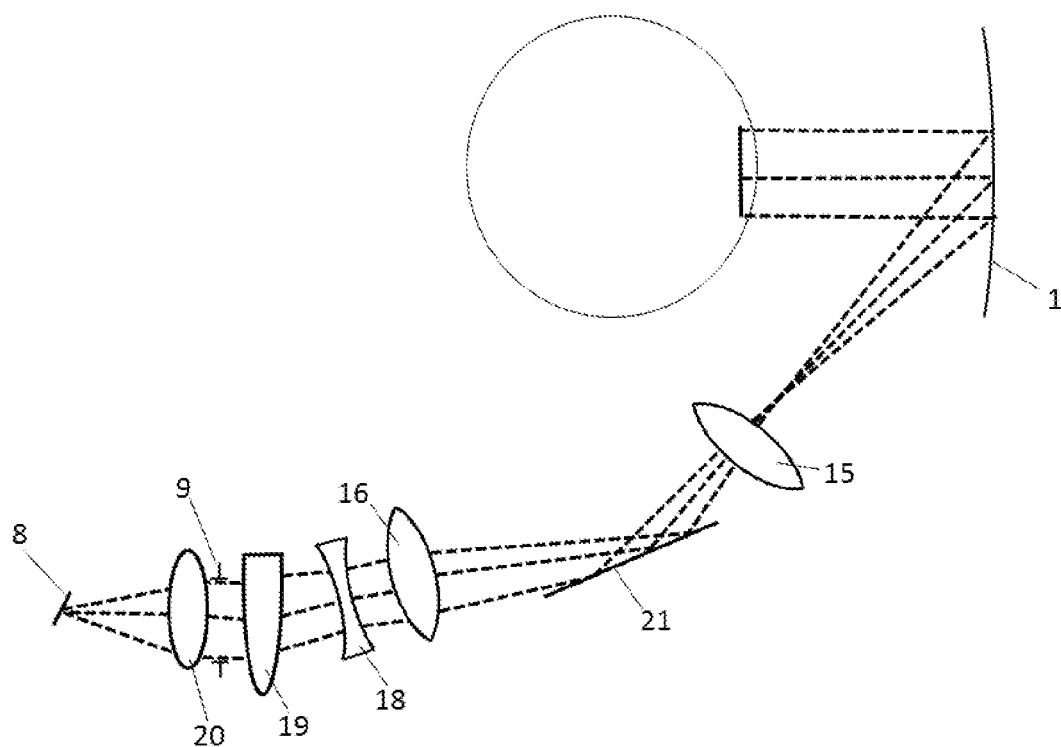
FIG. 3a shows a schematic outline of the image projection optics.
Figure 3B:
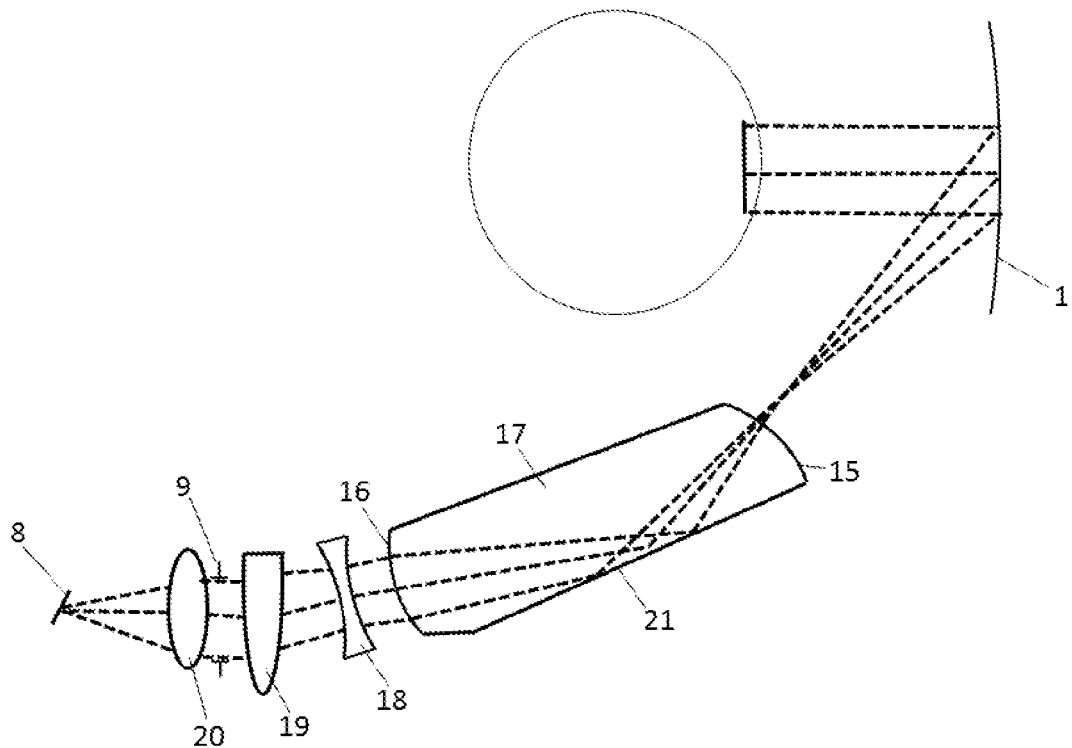
FIG. 3b shows a schematic outline of the image projection optics incorporating an integrated optical block.

FIG. 3a and FIG. 3b depict the image projection optics 7 schematically in more detail. It is necessary to consider the design of the primary reflecting optic and the image projection optics together, since they together make up a single imaging system. The requirement to balance aberrations between these two parts of the imaging system means that the designs cannot be decoupled.

The image projection optics comprise the following optical components, component groups and surfaces.

The primary reflecting optic 1 may be an embedded grating, a non-embedded segmented Fresnel reflector or a conventional aspheric mirror with a continuous surface. The function of this surface is to provide a displayed virtual image 2 at some convenient distance in front of the viewing optics 4 by reflecting and magnifying the off-axis intermediate image 3. The form of the reflector is designed to achieve the chosen virtual image distance while ensuring that the ray bundle from the image projection optics 7 remains compact through appropriate selection of the intermediate image position and consequently the size of the intermediate image and the divergence of the rays at the intermediate image location. Maintaining a compact ray bundle allows the size of the image projection optics to be minimised.

The slope of the reflecting surface of primary reflecting optic 1 must be tilted relative to the viewing axis so that the off-axis intermediate image is directed onto the viewing axis. The curvature of the reflecting surface in the direction parallel to the tilt and the curvature in the direction normal to this need to be determined independently to minimise the aberration within the intermediate image. To accomplish this, the form of the reflecting surface may typically include biconic terms and polynomial terms aligned to the two aforementioned axes. Additional terms such as tilt, decentre, paraboloid, hyperboloid and Zernike polynomial terms may also be included to provide further degrees of freedom for optimisation.

Optical surface group 15 and optical surface group 16 typically comprise aspheric refractive surfaces. The aspheric refractive function of each surface may be embodied in a single interface between air and a glass or plastic material, or in multiple such interfaces. Surface groups 15 and 16 may each be embodied by one or more separate components as shown in FIG. 3a or they may be integrated into a compound optical component 17 with multiple optical surfaces as shown in FIG. 3b.

Surface group 15 comprises a positive powered surface which is generally located close to the intermediate image and therefore functions in part as a field lens to ensure that the width and height of the image projection optics can be kept small while preventing vignetting of the light. Surface group 16 comprises a positive powered surface located some distance along the optical path from the intermediate image, and therefore contributes focusing power which, in combination with optical surface groups 18, 19 and 20, relays the light between the source image 8 and the intermediate image 3. Since surface group 15 is located close to a field plane and surface group 16 is located away from the field plane, by including aspheric terms on these two surfaces, they are able to correct most of the higher-order aberration terms that cannot be corrected by the other optical components in the system. These aspheric terms typically include polynomials along the vertical and horizontal axes due to the lack of rotational symmetry of the system.

Reflector 21 is an optional one or more reflecting surfaces. Typically these surfaces are planar and so they make no contribution to the optical performance or aberrations but they provide the ability to control the beam path in a flexible way. This may be to control the beam path to fit within a constrained spatial envelope, such as a compact head worn device where the beam path may be required to closely follow the side of the head. The number and orientation of reflections also affects the orientation of the source image plane, so reflections may be used to control this plane to be convenient for use with the selected image generation device.

The reflector 21 may be omitted if the application does not require the beam path to be deflected. The reflector may alternatively be one or more separate mirror components. The reflector may also be formed as part of compound optical component 17 with either or both of surface groups 15 and 16 as depicted in FIG. 3b. In this case, the reflector 21 may function by total internal reflection if the angles of incidence of the light rays are suitable to make this possible. Otherwise a reflective coating such as metal or a dielectric layer may be applied to the reflector surfaces of the compound optical component 17. Reflector 21 may also include non-planar surfaces which gives an additional surface for aberration correction at no additional part cost, although it may adversely affect the tolerance requirements.

The use of compound optical component 17 rather than separate discrete components has particular advantages. Incorporating complex surfaces into a single component reduces the overall component costs. Aspheric components and reflectors also typically have particularly stringent tolerance requirements, so forming them as a single component allows positional tolerances of these parts relative to one another to be controlled at the component manufacture stage, thereby removing errors and cost from the assembly stage. To further assist with tolerances, alignment features can be formed into the integrated component to allow precise positioning of that part within the assembly.

The required tolerances can be achieved using precise tooling or computer controlled machining. The part can be made in low volume by a custom machining process such as diamond cutting. In high volumes, this part can be manufactured by injection moulding or casting. Suitable materials include optically clear polymers such as PMMA, polycarbonate, polystyrene, CR-39, COC or COP. Glass may also be used.

Optical surface groups 18, 19 and 20 may comprise lenses with only spherical or plane surfaces. Such spherical lenses are simpler to fabricate in high performance glass materials and are generally lower cost and are less affected by assembly tolerances. One or more of these surfaces may optionally incorporate aspheric surfaces if required. One or more of the lenses may be replaced with two or more lenses of similar total function to further optimise the performance at the expense of system cost, size and complexity.

Together with surface groups 15 and 16, surface groups 18, 19 and 20 perform the function of relaying the light between the source image 8 and the aberrated intermediate image 3, and controlling the aberrations in the intermediate image to compensate those unavoidably introduced by the primary reflecting optic 1. The general form of the sequence of surfaces from 15 to 20 follows the well known pattern of positive power surrounding a negative power that is often employed in imaging optics (for example in Cooke triplet and double Gauss designs). Additionally, in designing the system, the surfaces are free to be displaced or rotated from the local optical axis. This gives the required degrees of freedom to correct the binodal aberrations introduced by the tilted reflection from the primary reflecting optic 1 and the embedding refractive surface 14. It also allows for correction of the prism introduced by passage of the light into and out of the embedding component 13 via the tilted reflecting surface.

Surface group 18 comprises a negative powered lens which may be tilted or displaced relative to the local optical axis. The negative power contributes to achieving low field curvature. The lens may be plano-concave to reduce cost and to facilitate assembly by providing a flat reference surface.

Surface groups 19 and 20 provide the final positive power to bring the light to/from a focus at the source plane. Splitting the positive power across multiple surfaces contributes to control of the spherical aberration. One or more of these surface groups may be tilted or displaced relative to the local optical axis to contribute to control of the binodal aberrations and prism. One or more of these surface groups may be a multiple element lens, such as an achromatic doublet. This is important to control axial colour aberration in applications where non-monochrome light is used. One or more of these surface groups may be plano-concave to reduce cost and to facilitate assembly by providing a flat reference surface.

Typically the pupil of the overall system is the entrance pupil 6 of the viewing optics. In the case of a visual system, this is the pupil of the eye. The optical system images this pupil plane to an approximate intermediate pupil located in the vicinity of surface groups 18-20. An iris 9 may be employed at this location to control the size of the ray bundle passing through the optical system and to control the resulting eyebox/exit pupil 5 of the system. This has the benefit of reducing stray light and glare, and blocking parts of the image path that are less well corrected for aberrations.

The system described provides sufficient design flexibility to reduce most of the aberrations to levels that provide close to diffraction limited performance. One defect that cannot be easily reduced is the tilt of the source image plane 8 relative to the axial ray 11. Forcing the tilt to zero can be achieved but requires significant extra compensation optics to achieve equivalent optical performance. Allowing the tilt of this plane normal to vary, typically between 25 and 65 degrees from the optical axis as shown in FIGS. 1, 3a and 3b allows good imaging quality to be achieved with a simpler system.

Image tilt is an example of an image defect that can be tolerated because it does not prevent formation of a sharp image within a suitable plane. Other such defects include distortion and lateral colour aberration. These defects can be corrected by pre-processing the image data to apply compensating distortions to the image provided by the image generation optics 12. As with image tilt, by not forcing the optical design to minimise these defects, the system can be more effectively optimised to minimise the other aberrations.

A tilted image plane facilitates the design of the image projection optics, but the image generation optics must then be adapted to provide the source image on this tilted plane. In some cases this may be difficult. Where it is not possible or undesirable to adapt the image generation optics, either the source image plane must be forced to be zero, with loss of imaging quality, or the source image plane must be tilted by some other means.

Figure 4:
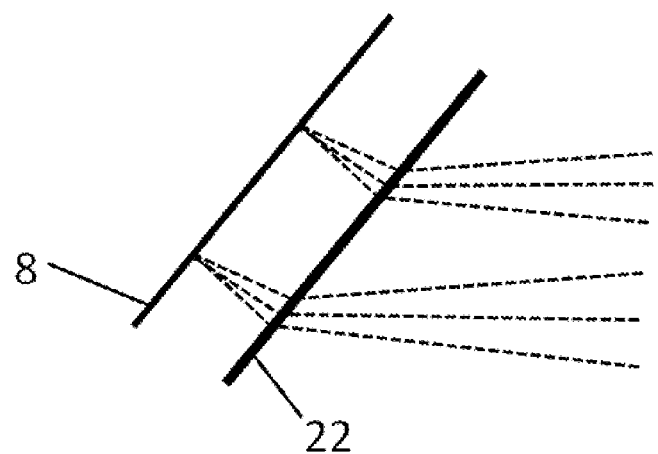
FIG. 4 illustrates the function of a direction turning component.

An approach to tilt the source image plane is to add a direction turning component 22 to the image path, as illustrated in FIG. 4. A direction turning component is a component that applies a tilt to the wavefront, resulting in a tilt of the image plane relative to the propagation direction that can be used to remove the tilt ordinarily present in this system. A direction turning component may operate in transmission as shown in FIG. 4 or in reflection.

One example of a direction turning component is a prism, which may be convenient for a single wavelength. Where multiple wavelengths are present the system must either include compensating optics to remove the lateral colour separation, or this separation must be removed by pre-processing the generated image with a compensating lateral colour spread.

A second example of a direction turning component is a prismatic film which comprises an array of very small prism structures in the form of a grating. This also suffers from a wavelength-dependent turning effect which may need to be compensated as for a prism, but if positioned approximately coincident with the image plane the lateral spread may be minimal. In this case, the prismatic film should preferably be selected such that the pitch of the facets is equal to or smaller than the size of the pixels in the image to avoid image artifacts arising from the facets.

A third example of a direction turning component is a grating reflector. This is similar to the grating that may be used in the primary reflecting optic, but where both the substrate and the reflecting facets are substantially flat. This may introduce new aberrations that must be compensated by other components in the system, but this can be avoided if the grating reflector is positioned approximately coincident with the image plane.

A fourth example of a direction turning component is a blazed diffraction grating. This may work in transmission or reflection and is similar in function to a prismatic film or grating reflector described above. The primary difference is that the facet pitch is small enough that the light is significantly affected by diffraction, causing the light to split into multiple diffraction peaks. The diffractive effect makes this unsuitable for use anywhere apart from at the image plane, in which case the diffractive peaks are recombined by the imaging optics. The blazing of the grating facets allows light to be directed into the preferred diffractive orders corresponding to the tilted light path. The benefit over a non diffractive grating is that the facets can be sufficiently smaller than the image pixels that they are not easily visible in the final image.

The system as described thus far may retain a symmetry plane normal to the plane of the drawings in FIGS. 1-3. This has several benefits. Since all the aberrations will also retain the same symmetry axis in the system, disregarding assembly tolerances, the number of degrees of freedom in the design that are useful to correct the aberrations is significantly reduced compared to the non symmetrical case. These degrees of freedom exclude decentrations that are not parallel to the symmetry plane, rotations that are not about an axis normal to the symmetry plane, and asphere terms that are not even about the symmetry plane. This significantly facilitates the design process, since optimisation algorithms are typically at least quadratic with the number of free parameters, and can be exponential. Symmetry also reduces the complexity of the components and the assembly.

For a strictly symmetrical system, the optical path, the axis of the viewing optics and the shape of the primary reflecting optic are all constrained to be symmetric about a common plane. There are many cases where this is undesirable. This includes situations where it is desirable for the primary reflecting optic to be incorporated within a non-bilaterally symmetric form for aesthetic or other reasons. For example, if the reflector is embedded in spectacle lenses, it may be desirable for the lenses to have a pantoscopic tilt which breaks the bilateral symmetry. Other examples include cases where the reflector may be embedded in a helmet visor, windscreen or other window that has a predefined or constrained form. Another example is where the desired position of the displayed image is significantly away from the symmetry plane, for example if the image is required to be below the horizontal plane.

In some cases it may be possible to accommodate a break in the symmetry of the overall system without losing the symmetry of the underlying optical design. In these cases, a component group may be tilted while maintaining its own bilateral symmetry such that a planar reflector may be used deflect the beam path in such a way that the axis of symmetry of the tilted component group is mapped onto the axis of symmetry of the remaining optical path. Additional planar reflectors may be used to achieve additional breaks in symmetry provided each segment of the optical path is in itself bilaterally symmetrical. A component group may comprise one or more components or surfaces. Reflector 21 may be conveniently employed as the reflector to achieve such a remapping of symmetry planes.

This approach may be used for example in HMD spectacles with pantoscopic tilt. This can be achieved using a single planar reflector to redirect the light path. The first part of the light path from the image source to the reflector is selected to provide a convenient path close to the head of the wearer and in a horizontal direction to follow the path of the arms of the spectacles. The second part of the light path from the reflector to the eye is selected to have a common symmetry axis with the tilted spectacle lens and the eye, when the eye is rotated to view the image. The observed image is also required to share this symmetry axis.

The need to maintain bilateral symmetry of each section imposes some restrictions on the system design. In cases where these restrictions are not acceptable, it is also possible to break the underlying symmetry of the optical path. In this case, additional degrees of freedom can be introduced into the component design and placement which are not constrained by bilateral symmetry. These degrees of freedom allow for asymmetric components or image location to be accommodated at the expense of increased design complexity. The basic sequence of surfaces and components however remains unchanged.

As previously outlined, the image generation and illumination subsystem is required to generate the spatial image information at the image plane with a sufficient brightness of light emanating from this image in the direction of the entrance pupil of the image projection optics such that the final displayed image meets the brightness requirements of the application.

There are several approaches of generating this illuminated image which fall into a few categories, namely emissive, transmissive, reflective and projected. For the emissive, transmissive and reflective cases, the image information is formed by a pixellated imaging device at the image plane, while for the projected case, the image is generated remotely and projected onto the image plane with additional optics. These four cases will now be described in more detail.

An example of an emissive device is an organic light emitting diode (OLED) display. Since this type of device acts as light source as well and spatial pattern generator it needs little additional optics so it is simple and compact. Current OLED display devices have relatively low brightness so they are most useful where the brightness requirement of the final display is relatively low. This may apply where the transmittance of the primary reflective optic is low or zero or where the ambient light brightness is expected to be low so that the brightness contrast of the display against the background is sufficiently high. Future OLED display devices with higher brightness may increase the applicability of this approach.

A challenge with use of an OLED or other emissive display is that light is typically emitted primarily in a direction normal to the display plane. Where the image plane is tilted relative to the axial ray of the image projection optics, it is likely that only a small fraction of the emitted light will be captured by the entrance pupil of the image projection optics, significantly reducing the output brightness and device efficiency. In this case, use of one of the direction turning approaches described above may be appropriate.

An example of a transmissive device is a liquid crystal display (LCD). In this case, the pixellated device modulates the colour and brightness of incident light from an illuminator. The direction of the light from the illuminator may be selected to be aligned with the axial ray of the image projection optics to maximise the collection efficiency of the transmitted light, but typical LCD devices are not designed to efficiently transmit light that is tilted relative to the axis normal to the display. This may be overcome either by aligning the illuminator to the LCD axis and using a direction turning approach as for the emissive case, or by using an LCD device that has been specially designed for use with oblique illumination.

The illuminator should be designed so that it provides light at the image surface that is sufficiently uniform in colour and brightness across the area of the source image so that the final displayed image looks uniform in colour and brightness. The illumination light should also not vary excessively in colour and brightness with angle so that the appearance of the final image does not vary substantially with the position of the viewing optics within the eyebox.

Methods that can be used to provide suitable uniform illumination include widely known approaches such as use of homogenising light pipes and diffusers, planar lightguides with additional microstructured optical films that enhance the brightness or control the light direction, Kohler illumination and microlens array (so called "fly's eye") homogenisers. To use the light efficiently, it may be useful to employ a field lens close to the image plane to relay the light source onto the entrance pupil of the image projection optics.

In many cases the illuminator provides white illumination and the display device modulates the colour as well as the spatial information. Some display devices do not have colour modulation capability, and in this case the light source must sequentially provide red, green and blue illumination synchronised with the light modulator image to recreate a colour image. The separate coloured light sources need to be combined using a suitable beam combiner that provides efficient overlap of the three colours to prevent colour variation within the final image.

Examples of reflective devices are digital micromirror devices (DMD) such as those in the Texas Instruments DLP technology, and liquid crystal on silicon (LCOS) microdisplays.

As for transmissive approaches, these are light modulators that need a homogenised source of illumination to be directed onto the display surface. This illumination can be generated using similar methods to those described for transmissive devices, but in this case the illumination is incident from the same side of the display as the light emanating from the display towards the image projection optics. This places additional geometrical constraints on the design of the illumination optics, since the illumination optics must not block the imaging path.

This can be achieved simply with a DMD device, since the pixels of the device are able to reflect efficiently at a wide range of angles. Therefore the angle of incidence of light from the illumination optics may be significantly separated from the axis of the image projection optics.

Figure 5:
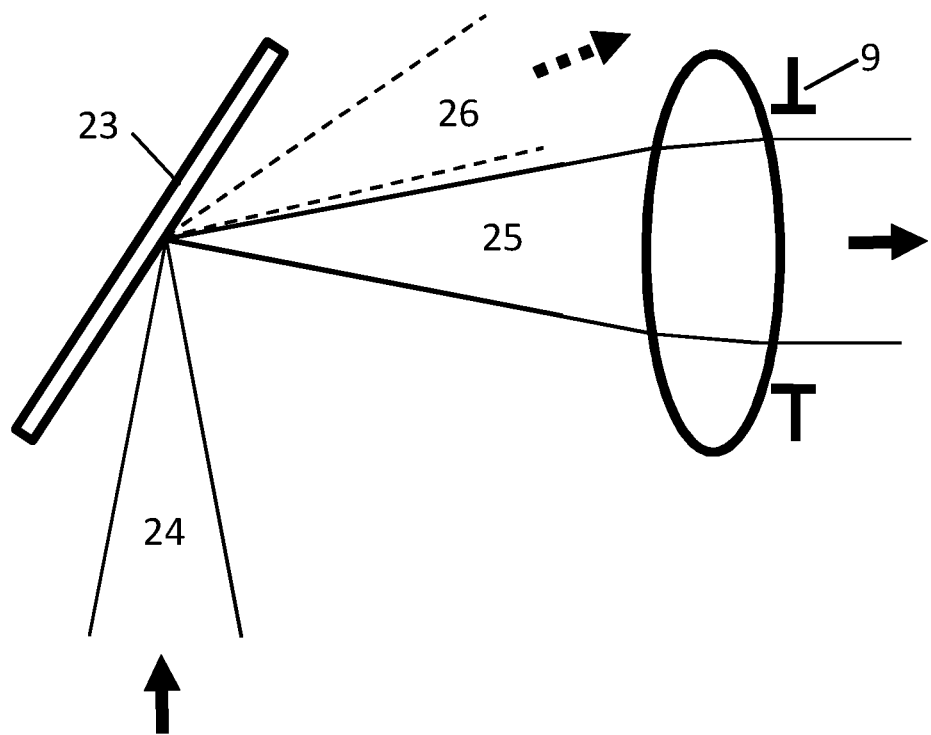
FIG. 5 shows the light cones into and out of a DMD image generation device located at the source image plane.

One particular convenient configuration is depicted in FIG. 5. In this case, the illumination light 24 is angled at approximately 90 degrees from the axis of the image projection optics. The image plane is chosen to be at such an angle that the micromirrors of the DMD device 23 are at 45 degrees to both the image projection axis and the illumination axis when they are in the 'on' state of the device so that light 25 is reflected efficiently from illuminator to image projection optics and passes through the iris 9. In the off state of the device pixels, the light 26 is deflected away from the image projection optics entrance pupil so that it does not pass through the iris. To ensure that this gives a good 'black' state, it is important that the cone angle of the illuminator light has a sharp cut-off so that the edge of the light cone does not reach the entrance pupil. For a DLP chip, the tilt angle between the unpowered state and the on state is 12 degrees for the some devices or up to 17 degrees for other devices. Selecting the image plane to be tilted by 33 degrees from the axis means that when the micromirrors are tilted by 12 degrees they provide a reflecting surface at 45 degrees that is able to deflect the illumination light into the entrance pupil. Following the same principle, this configuration may be varied to achieve the same effect using different angles.

Figure 6:
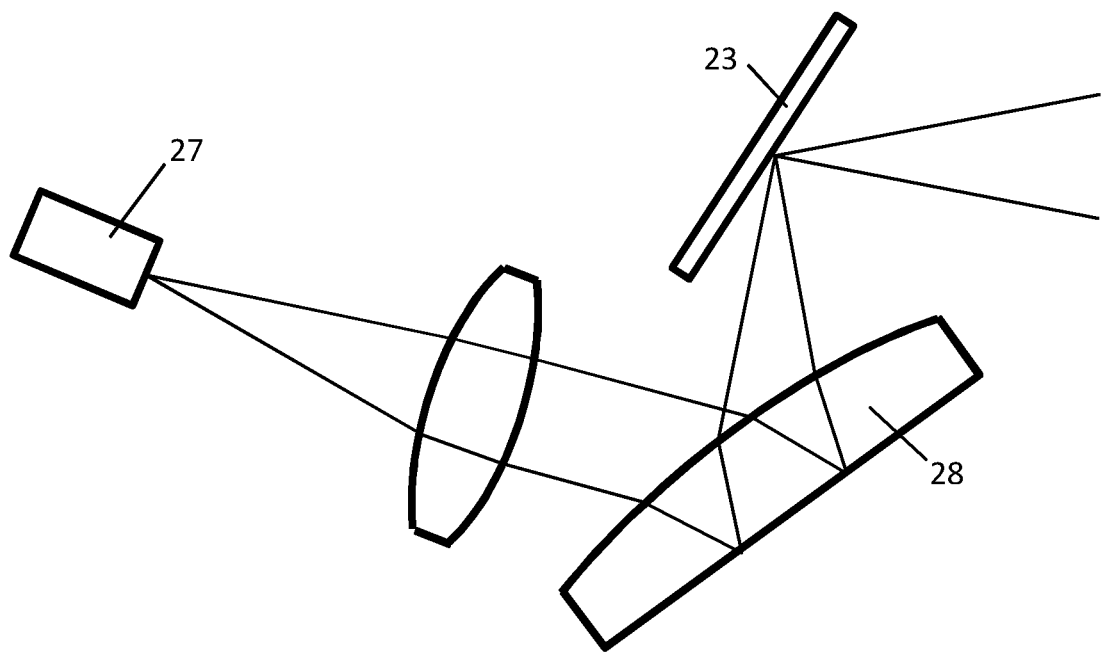
FIG. 6 Shows a possible configuration for applying illumination with the required characteristics to a DMD image generation device.

This approach allows the light to be brought into the image plane from a direction away from the imaging path, but in some applications this may not be convenient. For example, in smart glasses it is preferable for the illuminator to be in line with the imaging optics to follow the line of the spectacle arm. The deviation from this line can be minimised by reflecting the illumination path again to pass alongside the image plane, substantially parallel with the image projection path. An example arrangement is depicted in FIG. 6. In this arrangement, light from the homogenised light source 27 is directed onto the DMD device 23 via a system of optics that include a component 28 with both reflective and refracting surfaces. Component 28 could be embodied by a planoconvex lens with a mirror coated planar surface.

LCOS devices are typically designed for use with telecentric illumination and reflection, using a beamsplitter to allow incoming and outgoing beams to occupy the same space. They do not reflect efficiently at other angles. This is not easily adapted to use with a tilted image plane. To use an LCOS device it would be necessary to adjust the imaging path to require an untilted image, to use additional optics to relay the LCOS image plane onto the tilted image plane, or to provide an LCOS device that has been specially designed to function with oblique illumination and reflection.

An example of a projected image system is a laser scanner with a specially designed scan lens that brings the scanned laser beam to focus on the image plane. Due to the small divergence of laser beams, it would be necessary to also provide a diffusion screen at the image plane to ensure that the light is distributed evenly throughout the entrance pupil of the image projection optics. Depending on the arrangement of the scan optics, this diffusion screen could work in transmission (rear projection) or in reflection (front projection). It is also likely that a means to reduce laser speckle will also be required.

Figure 7:
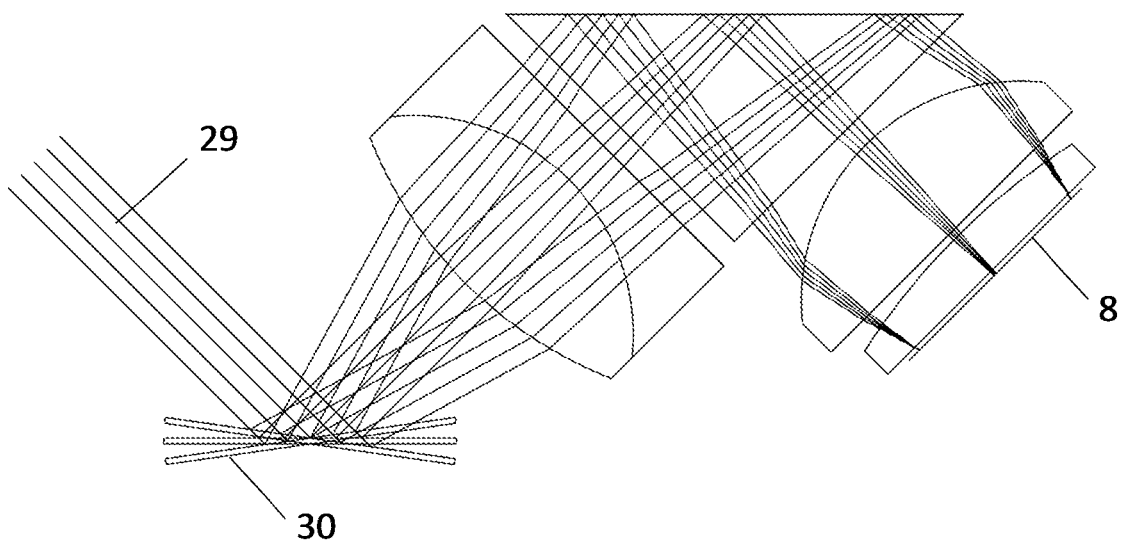
FIG. 7 shows a possible arrangement for generating the source image using scanned laser beams combined with scan optics.

A possible design for the scan optics is shown in FIG. 7. In this arrangement, collimated laser beams 29 enter from the left. For a full colour display these should be red green and blue lasers arranged to be coaxial using beam combiners. The beams are incident on a beam-steering mirror 30 shown in the figure at three different angle positions. The beam steering mirror may be a MEMS device in a compact system or galvanometer driven scan mirrors in a larger system. A system of lenses then focuses the collimated beams onto a planar surface such that the angle of the beam emerging from the beam-steering mirror maps to a position in the image surface. FIG. 7 also shows an optional 90 degree reflecting prism which allows the light to be brought onto a tilted image plane within a compact form factor. Any reflecting component could be used for the same purpose. This arrangement would require a direction turning component as discussed earlier to redirect the light toward the entrance pupil of the image projection optics.

An alternative scan optics design could be employed where the focused laser beams from the scan optics are incident onto the tilted image plane in a direction substantially aligned to the axis of the image projection optics such that no direction turning component is necessary. In this case the scan optics design would be significantly more complex.

For an image generated by scanned laser beams, the image formed is not constrained to a regular array of pixels. The arbitrary beam path within the image plane may allow any distortion in the image projection optics to be more easily corrected. The lack of sharply defined pixels may also reduce Moiré effects in the presence of a prismatic direction turning film.

Another example of a projected image system is a display of any type, including those previously described, combined with optics to relay the display output onto the image plane. This provides additional flexibility in positioning and type of display, but requires additional optics that will add to the system cost, size and complexity.

The following discussions consider specific embodiments of the image projection optics.

Example Embodiment 1: Bilaterally Symmetric Design

Figure 8A:
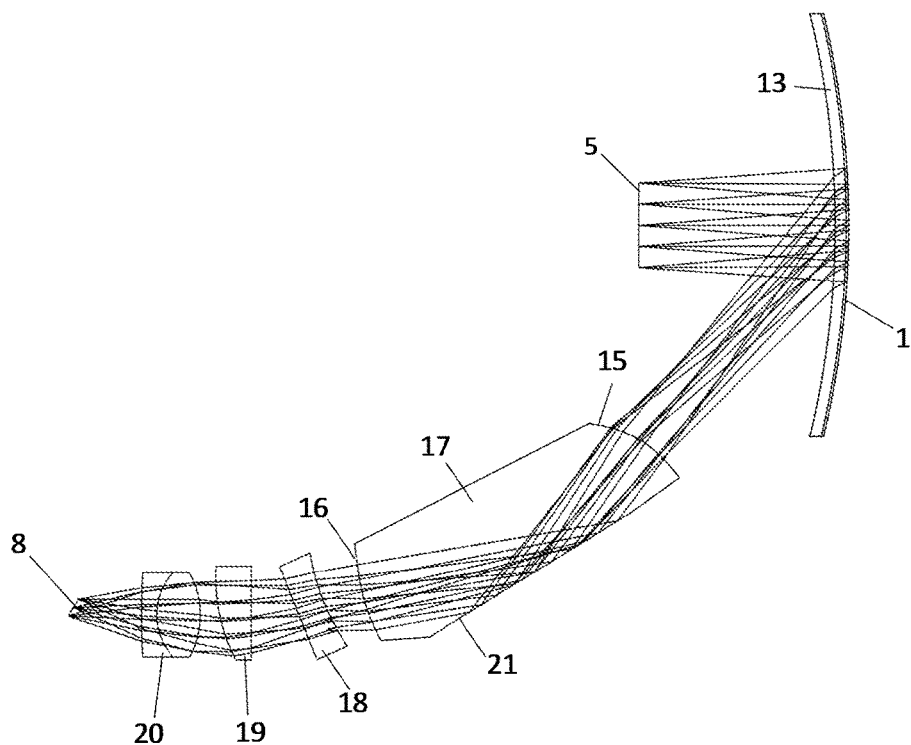
FIG. 8a shows a first example embodiment of the system where the primary reflecting optic is an embedded grating and the system is bilaterally symmetric.

A first example embodiment is shown as a sectional view of the optical configuration in FIG. 8a. This example system is designed for a head mounted display so the viewing optics are in this case a human eye. The primary reflecting optic 1 is an embedded grating. In this example, the embedded grating and embedding component 13 are not tilted relative to the axis of the viewing optics, and the whole system has bilateral symmetry.

FIG. 8*a* shows example light rays though the system where the exit pupil 5 is designed to have a 10 mm diameter. This may be reduced to for example 6 mm for a more compact system.

The construction of the embedded grating and embedding optic comprise the following:

- Two ophthalmic lenses made from CR-39. Both lenses have base-5 curvature and 0 D optical power.
- An aspheric grating reflector formed on the rear, concave surface of the front lens by embossing a UV curable resin and subsequently coating with a semitransparent layer of aluminium.
- An additional layer of the same UV adhesive between the two lenses that serves to laminate the two lenses together and embed the grating between index-matched layers.

Rays reflecting from the grating reflector encounter, in sequence, a concave air to CR-39 surface, a concave CR-39 to resin interface, the aspheric reflector surface, then the resin to CR-39 surface and CR-39 to air surface again in the reverse direction.

Figure 8B:
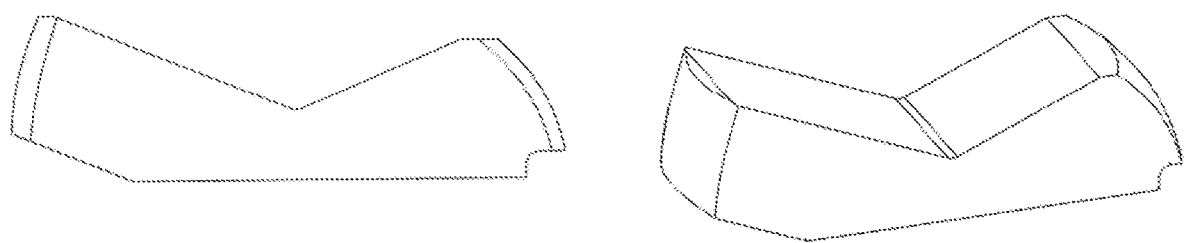
FIG. 8b shows two views of a compound optical component design for use in the first example embodiment.

Optical surface groups 15 and 16, and reflector 21 are embodied by a compound optical component 17. Drawings of an example embodied shape for this component are shown in FIG. 8*b*. This component has been made from PMMA by computer controlled machining, including diamond cutting of the optical surfaces. The example embodiment has been cut to remove unused parts of the material, thereby minimising the space required for the component. It also incorporates flat surfaces in addition to the optical surface which provide mechanical references for positioning the part in the system.

The curvatures of optical surface groups 15 and 16 are defined to be conic shapes with additional polynomial terms that are even in the vertical coordinate so that they maintain bilateral symmetry. Reflector 21 is planar and uncoated. The angle of incidence of rays on the surface is such that they undergo total internal reflection.

Optical surface groups 18, 19 and 20 are all embodied as stock glass lenses. All lenses are chosen to have relatively high refractive index glasses to minimise spherical aberration. Surface group 18 is a plano-concave lens, positioned with a tilt to the local optical axis. Surface group 19 is a plano-convex lens, positioned with a significant decentre from the local optical axis. Surface group 20 is an achromatic doublet lens positioned approximately aligned with the local optical axis. An iris can be optionally positioned between surface groups 19 and 20.

The normal to the source image plane 8 is tilted by 33 degrees from the axial ray. This is convenient when combined with a Texas Instruments DLP chip, which can give 12 degrees deflection when activated, thereby allowing illumination light to be brought in at 90 degrees from the optical axis.

The beam path of this embodiment is designed to closely follow the side of the head of the wearer so that the optical can be assembled into a compact spectacle frame. This design is achieved by applying appropriate positional constraints to the optical optimisation, and allowing certain parameters to vary to accommodate these constraints. These parameters include: deflection angle from the primary reflecting optic 1, deflection angle from reflector 21, and surface tilts and decentres of all the optical surface groups.

The length of the optical path is also a factor in achieving a compact design. This can be reduced by increasing the optical power of the optical surface groups. This has the side effects of increasing the magnification so that the size of the source image is reduced, and also reducing the image quality.

Figure 8C:
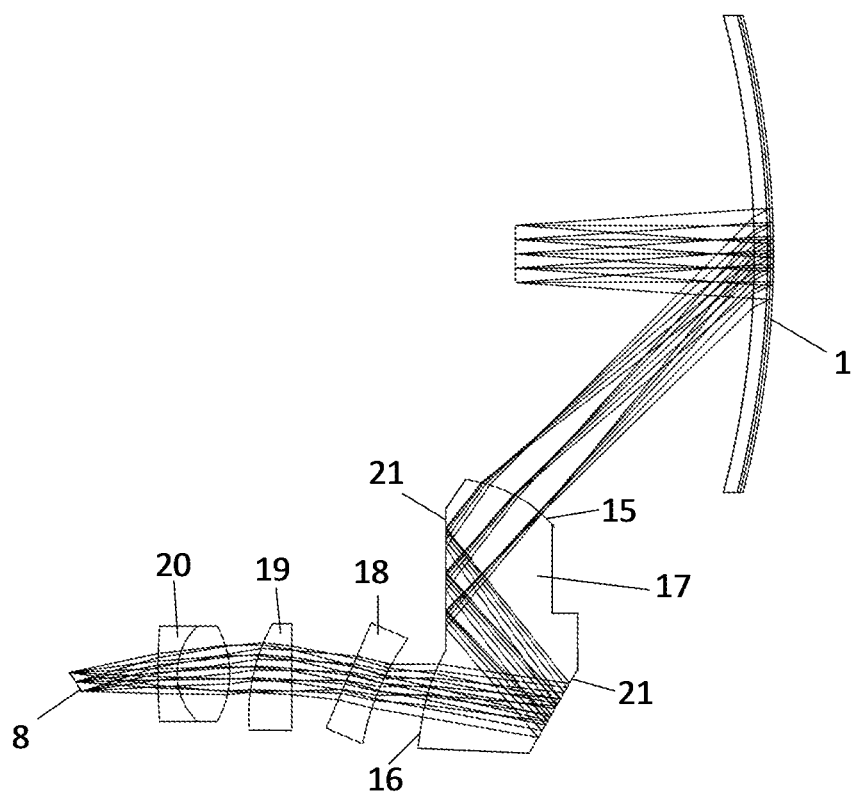
FIG. 8c shows an alternative layout of the first example embodiment, using an additional reflection to fold the beam path.

Another approach to reducing the length of the system is illustrated in FIG. 8*c*. This shows an embodiment that uses the same optical design as in FIG. 8*a*, but in which an additional fold mirror 21 is included in the compound optical component 17. The optical path length is unaltered, but the physical length is reduced by folding the optics further. In this example, the angle of incidence of rays at one of the two fold mirrors is insufficient to achieve total internal reflection so a reflective coating is required. The more compact compound optical component is also advantageous because the shape is less prone to distortion during manufacture.

Figure 9A:
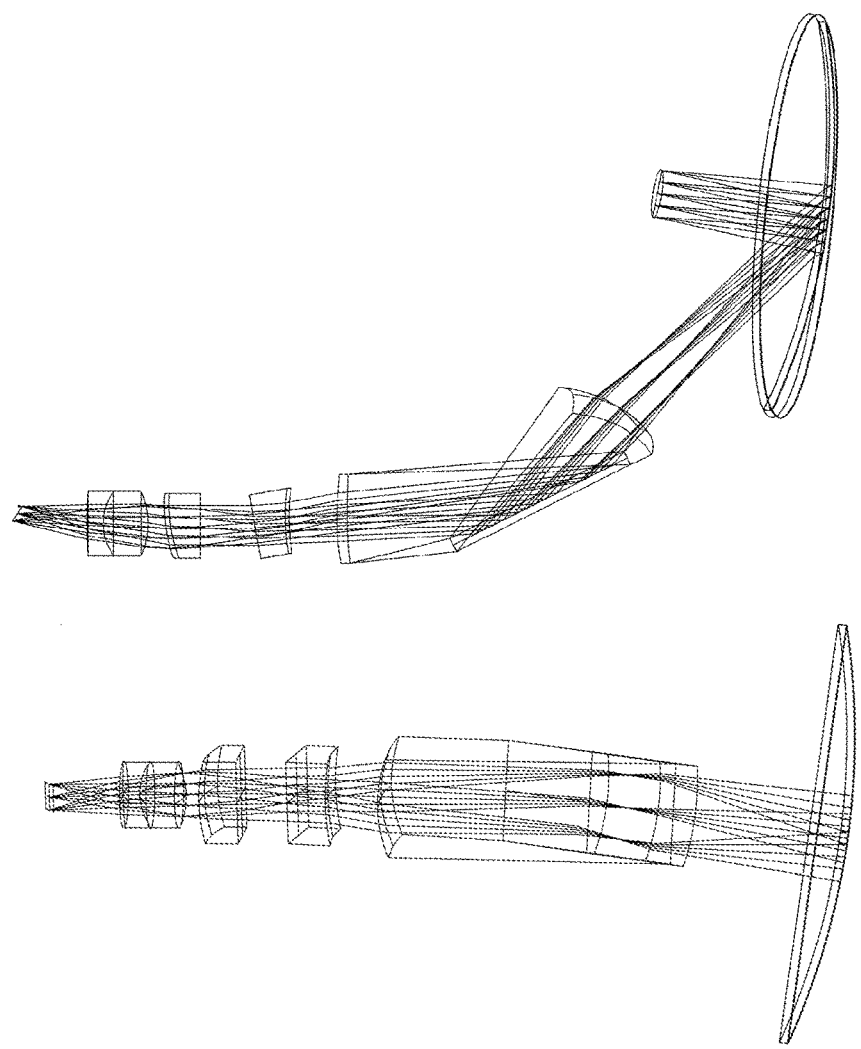
FIG. 9a shows two views of a second example embodiment of the system where the primary reflecting optic is an embedded grating and has a pantoscopic tilt.

Example Embodiment 2: Design with Primary Reflecting Optic with Pantoscopic Tilt A second example embodiment is shown in FIG. 9*a*. The Figure shows light rays though the system where the exit pupil 5 is designed to have a 6 mm diameter. This design shares many features with the first embodiment but differs in the following aspects.

The primary reflecting optic 1 and embedding component 13 have a pantoscopic tilt such that their axis is tilted relative to the horizontal axis of the head of the wearer. It is desirable for the arm of the spectacles to be aligned to the horizontal plane, so this prevents use of a fully bilaterally symmetric design.

In this embodiment, the segment of the optical system and optical path from the source image 8 to the reflector 21 is bilaterally symmetric, and the segment from the reflector 21 to the eye of the wearer is also bilaterally symmetric, but the two planes of symmetry are not coincident. The reflector 21 is planar, but tilted in such a way that the two path segments are mapped onto one another.

Figure 9B:
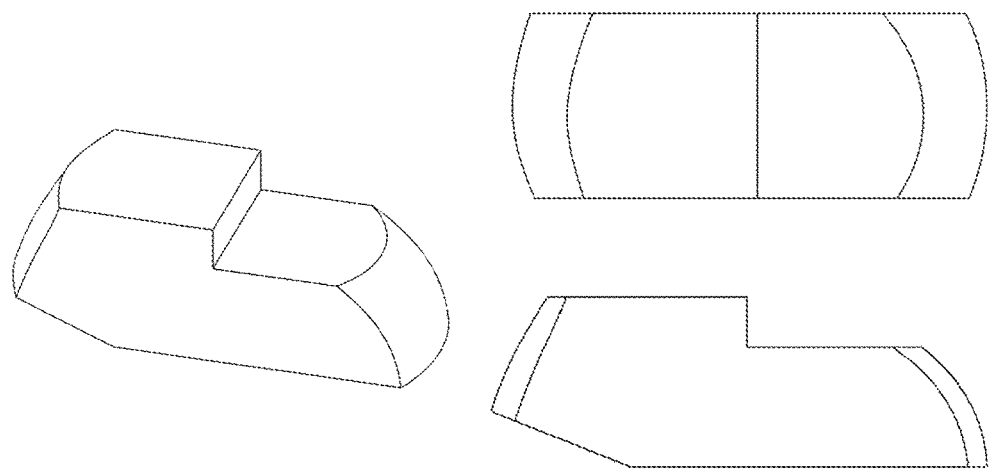
FIG. 9b shows three views of a compound optical component design for use in the second example embodiment.

By this method, the underlying optical design, and most of the optical components maintain bilateral symmetry but the compound optical component 17 is not symmetric because the two aspheric surfaces 15 and 16 no longer share a symmetry plane. An example embodiment of this component is shown in FIG. 9*b*.

Another way in which this embodiment differs from the first example is that the embedding component 13 is constructed differently. In this embodiment, the two ophthalmic lenses have a base-6 curvature, and the grating structure is formed within the material of the lens itself by an injection moulding or hot embossing process. The grating is formed into the front, convex surface of the rear lens element and then coated with a partially reflective coating. The two lenses are then laminated together using a resin that is closely index matched to the lens material.

Forming the grating onto the rear lens has multiple benefits. The reflected optical path is no longer affected by the material, tolerance or shape of the lamination glue or the front lens. This gives flexibility to add tint or optical power to the front lens. It also means that the machined microstructure of the mould is oriented in such a way that the rounded facet edges formed by the cutting tool are partially obscured from the light path.

Example Embodiment 3: Design with Non-Embedded Grating Primary Reflecting Optic

A third example embodiment is shown in FIG. 10. This design also shares many features with the first embodiment.

The main difference is that it uses a non-embedded grating as the primary reflecting optic 1. This significantly affects the off-axis and chromatic aberrations, but a similar sequence of components and surfaces is used to provide a good image. The tilts and decentres of the components have changed significantly to accommodate the removal of the embedding component.

It will be understood that the invention, and the embodiments above, may be extended by using multiple optical projection systems within a single overall system. For example, a display may be provided to both eyes simultaneously, or multiple display images may be combined by using multiple primary reflecting optics that are spatially separated or spatially interleaved or disposed in separate layers. Such combined systems may be used for example to provide multiple display images at different virtual image positions, different fields of view, or with different wavelengths or polarisations of light.

The invention claimed is:

1. An optical projection system that provides part of a display system that presents a displayed virtual image at a predetermined distance in front of a viewing position where said display system comprises a projection system and a primary reflecting optic that deflects an off-axis incoming optical signal from the projection system toward the viewing position, and where said projection system is arranged to provide an adapted output image signal that compensates for optical aberration effects introduced by the reflecting optic to ensure provision of a reduced aberration display image to the viewing position,
  where the optical projection system comprises a system of image generation optics and a system of image projection optics wherein the image generation optics provide a source image in the source image plane in the form of a spatially defined pattern of light and the image projection optics in combination with the primary reflecting optic relay said source image to the virtual image,
  where the image projection optics comprise, in order from the source image, a first optical surface group having positive refractive power, a second optical surface group having positive refractive power, a third optical surface group having negative refractive power, a fourth optical surface group having positive refractive power and a fifth optical surface group having positive refractive power,
  where at least one of the fourth and fifth optical surface groups are formed as a surface of a compound optical component.

2. The optical system of claim 1 where the primary reflecting optic comprises an embedded grating structure, and/or a non-embedded grating structure.

3. The optical system of claim 1 where the primary reflecting optic comprises a continuous aspheric surface.

4. The optical system of claim 1 where the primary reflecting optic is partially transparent or where the primary reflecting optic is not partially transmissive.

5. The optical system of claim 1 where the normal to the source image plane is tilted relative to the axial ray of the image projection optics.

6. The optical system of claim 1 where the image generation optics comprise a reflective display device.

7. The optical system of claim 5 where the image projection optics incorporate a direction turning component, the direction turning component comprising one or more of: a prism, a prismatic film, an array of prisms, a grating reflector, a diffraction grating.

8. The optical system of claim 1 where the first optical surface group comprises a cemented lens.

9. The optical system of claim 1 where at least one of the second and third optical surface groups comprise a single glass lens.

10. The optical system of claim 1 where at least one of the fourth and fifth optical surface group comprises a lens with a freeform aspheric surface.

11. The optical system of claim 1 where the compound optical component is formed from an optically transparent polymer.

12. The optical system of claim 1 where the compound optical component has alignment features formed within the surface to facilitate accurate positioning within the optical assembly.

13. The optical system of claim 1 where at least one reflective surface is positioned in the optical path between the fourth and fifth lens surface groups such that said at least one reflective surface is formed as a surface of the compound optical component.

14. The optical system of claim 13 where at least one of the reflective surfaces functions by total internal reflection.

15. The optical system of claim 13 where at least one of the reflective surfaces has a metallic coating or reflective dielectric coating.

16. The optical system of claim 13 where at least one of the reflective surfaces is planar.

17. The optical system of claim 1 where each optical path segment joining subsequent optical surfaces is designed to be bilaterally symmetric such that the curvature of the two optical surfaces adjoining said optical path segment share a common plane of symmetry.

18. The optical system of claim 17 where either all optical path segments share a common plane of symmetry or where there are at least two groups of optical path segments and wherein optical path segments in the same group share a common plane of symmetry and wherein different groups have non-coincident planes of symmetry.

19. The optical system of claim 18 where the optical surfaces that are common to two different groups of optical path segments are planar reflecting surfaces.

20. The optical system of claim 1 where the system is arranged to be used in a head mounted display.

21. The optical system of claim 20 where the head mounted display is a virtual reality headset, an augmented reality headset or arranged to be used as a transparent information display.

22. The optical system of claim 20 where the head mounted display is designed to be incorporated in a pair of spectacles, preferably including prescription lenses.

23. The optical system of claim 22 where the spectacle lenses have a pantoscopic tilt.

24. An optical projection system that provides part of a display system that presents a displayed virtual image at a predetermined distance in front of a viewing position where said display system comprises a projection system and a primary reflecting optic that deflects an off-axis incoming optical signal from the projection system toward the viewing position, and where said projection system is arranged to provide an adapted output image signal that compensates for optical aberration effects introduced by the reflecting optic to ensure provision of a reduced aberration display image to the viewing position,
  where the optical projection system comprises a system of image generation optics and a system of image projection optics wherein the image generation optics provide a source image in the source image plane in the form of a spatially defined pattern of light and the image projection optics in combination with the primary reflecting optic relay said source image to the virtual image, where the image projection optics comprise, in order from the source image, a first optical surface group having positive refractive power, a second optical surface group having positive refractive power, a third optical surface group having negative refractive power, a fourth optical surface group having positive refractive power and a fifth optical surface group having positive refractive power, where each optical path segment joining subsequent optical surfaces is designed to be bilaterally symmetric such that the curvature of the two optical surfaces adjoining said optical path segment share a common plane of symmetry.

* * * * *